United States Patent
Naik

(10) Patent No.: US 8,696,319 B2
(45) Date of Patent: Apr. 15, 2014

(54) THREE-DIMENSIONALLY WOVEN COMPOSITE BLADE WITH SPANWISE WEFT YARNS

(71) Applicant: United Technologies Corporation, Hartford, CT (US)

(72) Inventor: Rajiv A. Naik, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/886,043

(22) Filed: May 2, 2013

(65) Prior Publication Data
US 2013/0243603 A1    Sep. 19, 2013

Related U.S. Application Data

(62) Division of application No. 12/693,727, filed on Jan. 26, 2010, now Pat. No. 8,499,450.

(51) Int. Cl.
F01D 5/14    (2006.01)

(52) U.S. Cl.
USPC ..................... 416/230; 416/229 A

(58) Field of Classification Search
USPC ........... 416/229 R, 230, 241 R, 229 A, 223 A
See application file for complete search history.

(56) References Cited

U.S. PATENT DOCUMENTS

| 3,671,139 A | 6/1972 | Plowman |
| 4,426,913 A | 1/1984 | Orcutt |
| 5,013,216 A | 5/1991 | Bailey et al. |
| 5,222,297 A | 6/1993 | Graff et al. |
| 5,279,892 A * | 1/1994 | Baldwin et al. ............... 442/206 |
| 5,346,367 A | 9/1994 | Doolin et al. |
| 5,375,978 A | 12/1994 | Evans et al. |
| 5,672,417 A * | 9/1997 | Champenois et al. ........ 442/208 |
| 6,413,051 B1 | 7/2002 | Chou et al. |
| 6,607,358 B2 | 8/2003 | Finn et al. |
| 6,843,565 B2 | 1/2005 | Evans et al. |
| 7,101,154 B2 | 9/2006 | Dambrine et al. |
| 7,241,112 B2 * | 7/2007 | Dambrine et al. ............ 415/230 |
| 7,377,752 B2 | 5/2008 | Mohamed |
| 7,581,932 B2 * | 9/2009 | Coupe et al. .................. 416/230 |
| 2003/0017053 A1 | 1/2003 | Baldwin et al. |
| 2009/0047122 A1 | 2/2009 | Medynski et al. |
| 2009/0074586 A1 | 3/2009 | Le Hong et al. |

FOREIGN PATENT DOCUMENTS

| EP | 1526285 A1 | 4/2005 |
| GB | 2299379 A | 10/1996 |

OTHER PUBLICATIONS

B K Behera and Rajesh Mishra, 3-Dimensional Weaving, Indian Journal of Fibre & Textile Research, Sep. 1, 2008, pp. 274-287, vol. 33.

European Patent Office, Extended European Search Report, May 11, 2011, 6 pages.

* cited by examiner

*Primary Examiner* — Edward Look
*Assistant Examiner* — William Grigos
(74) *Attorney, Agent, or Firm* — Kinney & Lange, P.A.

(57) ABSTRACT

A composite blade has a root and a tip in a spanwise direction and a leading edge and a trailing edge in a chordwise direction. The composite blade includes a three-dimensional woven preform having weft yarns and warp yarns. The weft yarns extend in the spanwise direction of the composite blade. The warp yarns interweave the weft yarns and extend in the chordwise direction of the blade.

13 Claims, 6 Drawing Sheets

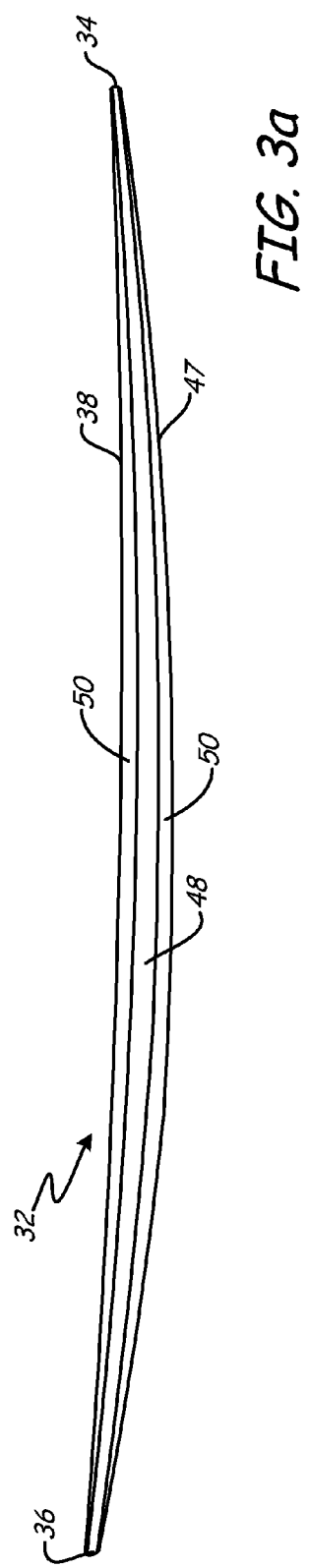

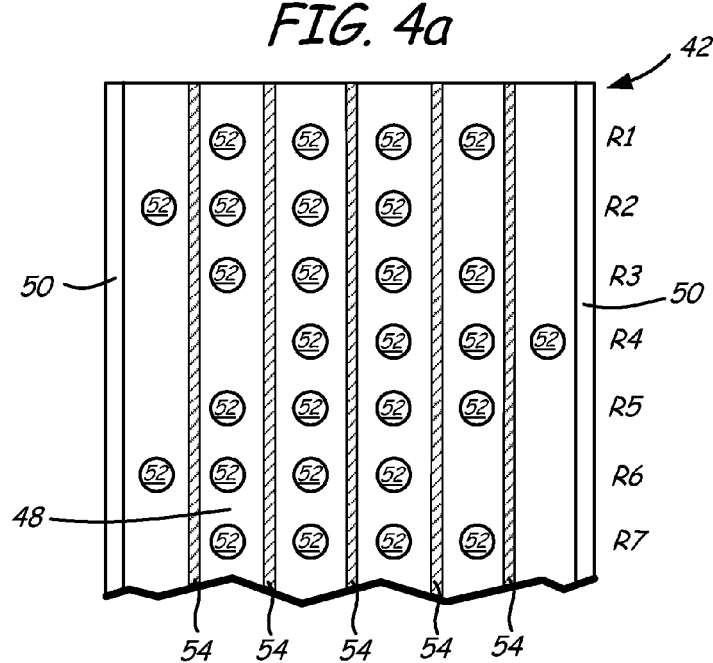
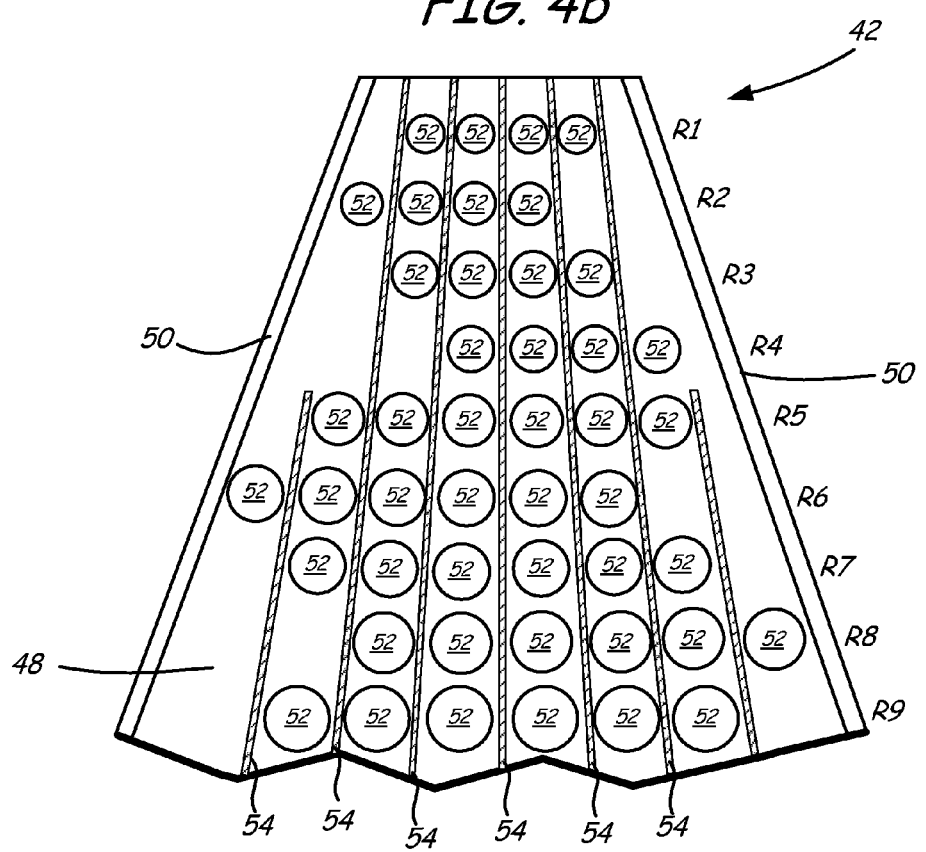

THREE-DIMENSIONALLY WOVEN COMPOSITE BLADE WITH SPANWISE WEFT YARNS

CROSS-REFERENCE TO RELATED APPLICATION(S)

This application is a divisional patent application of U.S. application Ser. No. 12/693,727, filed Jan. 26, 2010. All references are incorporated herein.

BACKGROUND

Composite materials offer potential design improvements in gas turbine engines. For example, in recent years composite materials have been replacing metals in gas turbine engine fan blades because of their high strength and low weight. Most metal gas turbine engine fan blades are titanium. The ductility of titanium fan blades enables the fan to ingest a bird and remain operable or be safely shut down. The same requirements are present for composite fan blades.

A composite fan blade can have a sandwich construction with a three-dimensional woven core at the center and two-dimensional filament reinforced plies or laminations on either side. To form the composite blade, individual two-dimensional laminations are cut and stacked in a mold with the woven core. The woven core extends from the root to the tip of the blade and the plies are stacked on either side of the woven core to form the desired exterior surface profile. The mold is injected with a resin using a resin transfer molding process and cured. Alternatively, the composite blade can comprise a three-dimensional woven core cured with resin without the two-dimensional filament reinforced plies.

SUMMARY

A composite blade has a root and a tip in a spanwise direction and a leading edge and a trailing edge in a chordwise direction. The composite blade includes a three-dimensional woven preform having weft yarns and warp yarns. The weft yarns extend in the spanwise direction of the composite blade. The warp yarns interweave the weft yarns and extend in the chordwise direction of the blade.

BRIEF DESCRIPTION OF THE DRAWINGS

FIG. 3a is a cross-sectional view of the composite fan blade of FIG. 2 taken along line 3a-3a.

FIG. 4a is a cross-sectional view of the composite fan blade of FIG. 2 taken along line 4-4 having a layer-to-layer angle interlock weave and a constant thickness tip.

FIG. 4b is a cross-sectional view of the composite fan blade of FIG. 2 taken along line 4-4 having a layer-to-layer angle interlock weave and a tapered tip.

DETAILED DESCRIPTION

Figure 1:
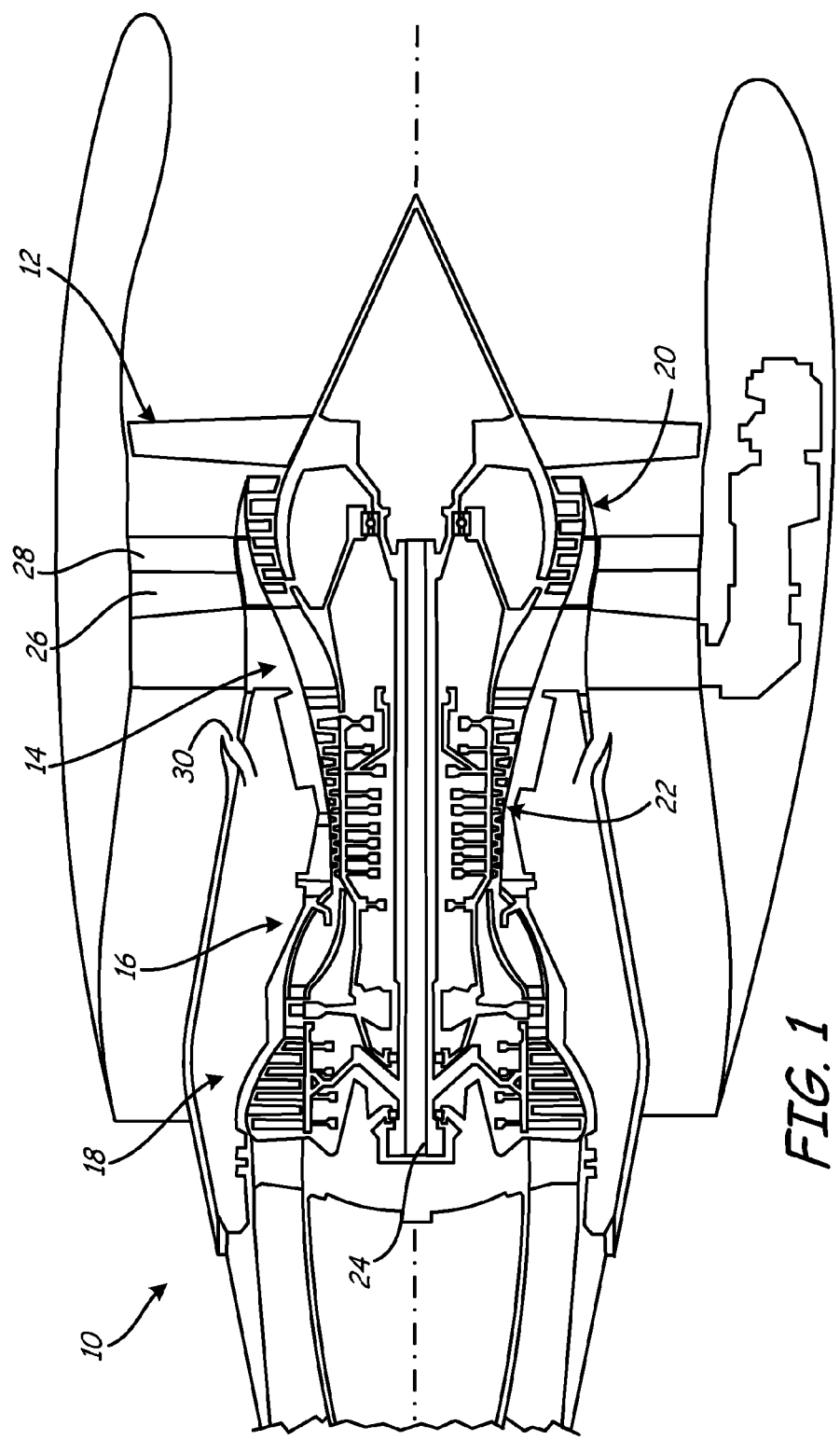
FIG. 1 is a cross-sectional view of a gas turbine engine having a turbofan.

FIG. 1 is a cross-sectional view of gas turbine engine 10, which includes turbofan 12, compressor section 14, combustion section 16 and turbine section 18. Compressor section 14 includes low-pressure compressor 20 and high-pressure compressor 22. Air is taken in through fan 12 as fan 12 spins. A portion of the inlet air is directed to compressor section 14 where it is compressed by a series of rotating blades and vanes. The compressed air is mixed with fuel, and then ignited in combustor section 16. The combustion exhaust is directed to turbine section 18. Blades and vanes in turbine section 18 extract kinetic energy from the exhaust to turn shaft 24 and provide power output for engine 10.

The portion of inlet air which is taken in through fan 12 and not directed through compressor section 14 is bypass air. Bypass air is directed through bypass duct 26 by guide vanes 28. Then the bypass air flows through opening 30 to cool combustor section 16, high pressure compressor 22 and turbine section 18.

Figure 2:
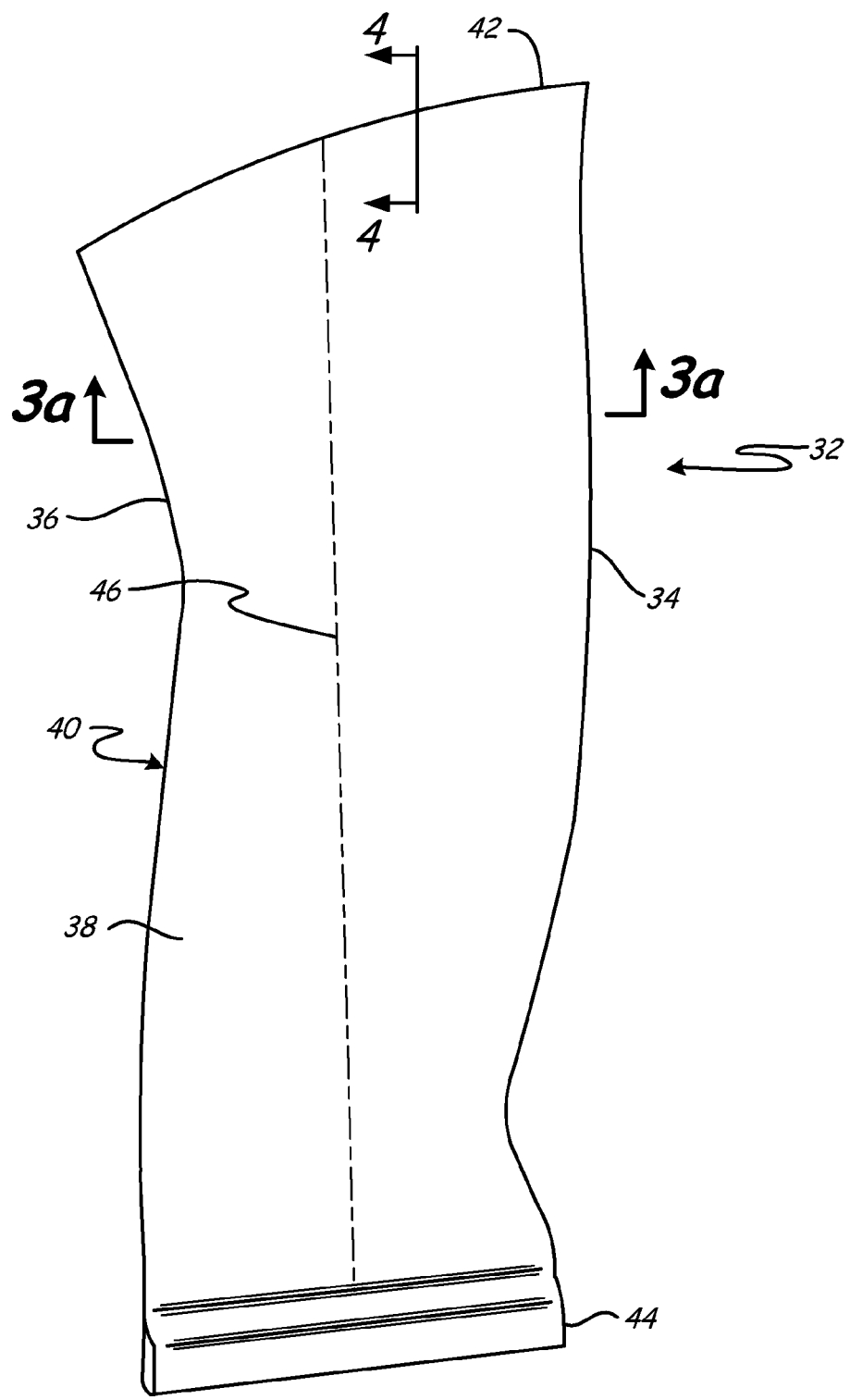
FIG. 2 is a perspective view of a composite fan blade for the turbofan.

Fan 12 includes a plurality of composite blades 32. FIG. 2 illustrates one composite blade 32, which includes leading edge 34, trailing edge 36, pressure side 38, suction side (not shown), airfoil 40 (having tip 42), root 44 and longitudinal or spanwise axis 46. Airfoil 40 extends from root 44 and includes tip 42. Root 44 is opposite tip 42. Longitudinal axis 46 extends from root 44 to tip 42. The span of blade 32 is generally defined along longitudinal axis 46.

FIG. 3a is a cross-sectional view of composite blade 32 taken along line 3a-3a. As shown, composite blade 32 includes preform 48 and laminate sections 50. Preform 48 is a three-dimensional woven composite formed from a plurality of yarns as described further below. Preform 48 extends the spanwise length of composite blade 32 from root 44 to tip 42. Preform 48 also extends the chordwise width of composite blade 32 from leading edge 34 to trailing edge 36. The shape of preform 48 generally follows the shape of blade 32.

Laminate sections 50 are positioned on either side of preform 48. Each laminate section 50 comprises a plurality of stacked airfoil plies, as is known in the art. Airfoil plies are two-dimensional fabric skins. Elongated fibers extend through the airfoil plies at specified orientations to give the airfoil plies strength. For clarity, the individual airfoil plies of laminate sections 50 are not shown in the figures.

To form composite blade 32, the plies of laminate sections 50 are stacked on either side of preform 48 in a mold, resin is injected into the mold, and the mold is cured. Example resins include but are not limited to epoxy resins and epoxy resins containing additives such as rubber particulates. Alternatively, vapor deposition can be used to deposit a ceramic matrix on the yarn of preform 48 in place of the resin. In another example, the plies of laminate sections 50 can be preimpregnated composites, (i.e. "prepregs") such that resin is not directly added to the mold. In a further example, composite blade 32 is formed by preform 48 without laminate sections 50. In this example, preform 48 is placed in the mold, injected with resin and cured to form composite blade 32.

Figure 3B:
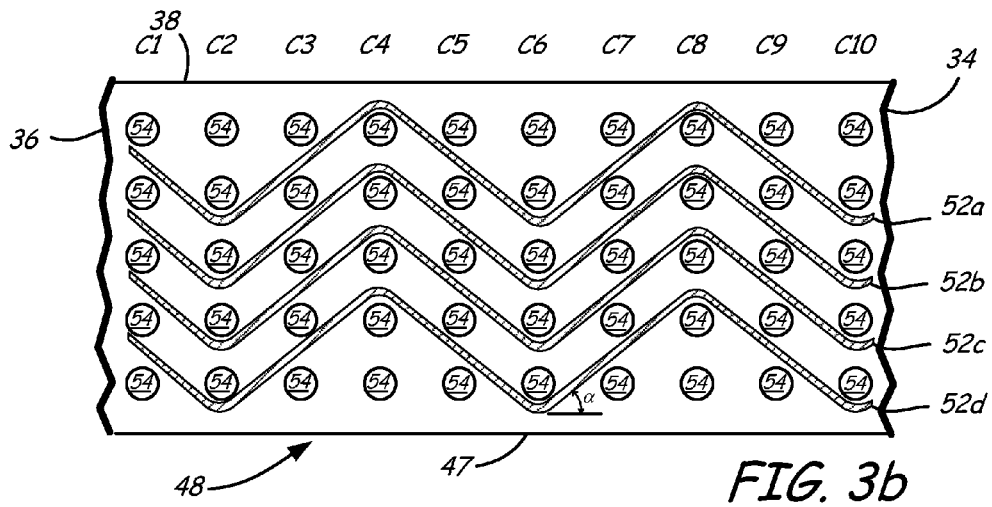
FIGS. 3b-3d are enlarged views of the composite blade of FIG. 3a illustrating a layer-to-layer angle interlock weave pattern.
Figure 3C:
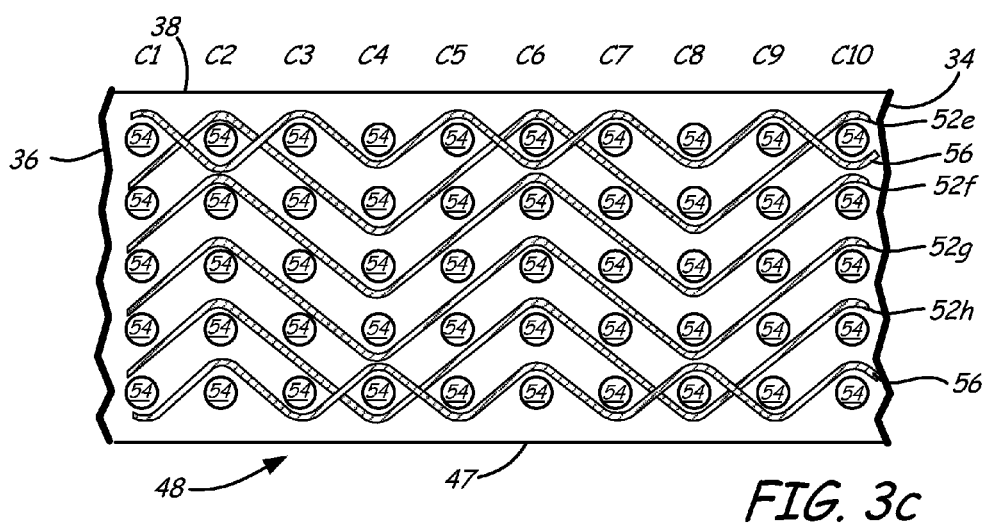
Figure 3D:
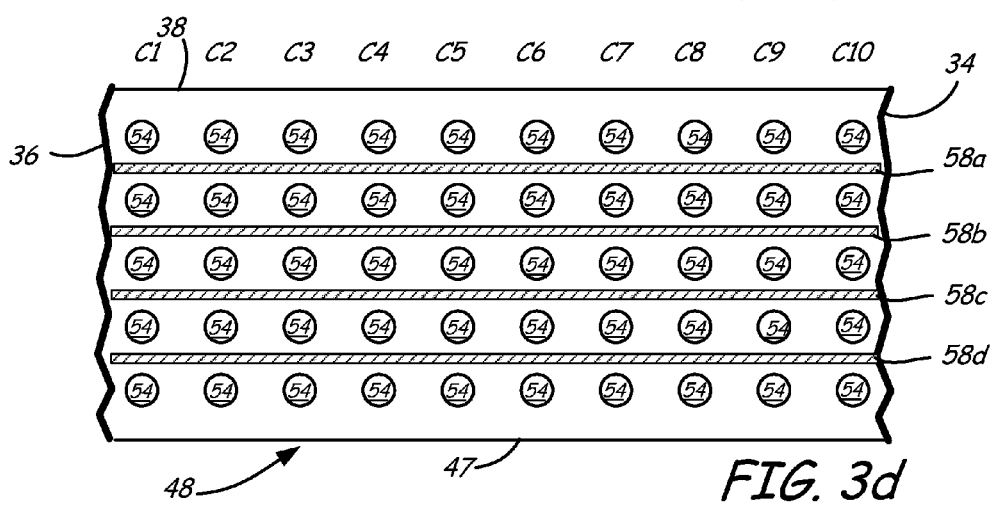

As described above, preform 48 is a three-dimensional woven composite formed by a plurality of yarns. FIGS. 3b-3d are enlarged views of preform 48 of FIG. 3a having a layer-to-layer angle interlock weave and including warp yarns 52, weft yarns 54, surface weaver yarns 56 and warp stuffer yarns 58. The layer-to-layer angle interlock weave pattern illustrated in FIGS. 3b-3d comprises three planes that are repeated along the spanwise axis of preform 48. Weft yarns 54 extend in the spanwise direction, and warp yarns 52 extend in the chordwise direction and interweave weft yarns 54.

FIG. 3b illustrates a first plane of the layer-to-layer angle interlock weave, FIG. 3c illustrates a second plane and FIG. 3d illustrates a third plane. The first plane shown in FIG. 3b includes warp yarns 52a, 52b, 52c and 52d (referred to generally as warp yarns 52) and weft yarns 54. Warp yarns 52 extend in a horizontal (or chordwise) direction between leading and trailing edges 34 and 36 of preform 48. Weft yarns 54 are placed at a 90 degree angle to the direction of warp yarns 52 and are aligned in a spanwise direction of preform 48. Weft yarns 54 extend between root 44 and tip 42 of preform 48.

Weft yarns 54 are shown distributed in ten columns (C1-C10). Each column C1-C10 contains the same number of weft yarns 54. Warp yarns 52 interlock weft yarns 54 with a layer-to-layer angle interlock weave. Warp yarns 52 can have a small angle α (such as between about 5 degrees and about 10 degrees), a large angle (such as between about 35 degrees and about 70 degrees) or any angle in-between. In the layer-to-layer angle interlock weaving pattern shown, warp yarns 52 interlock with every second weft yarn column in the chordwise direction. For example, warp yarn 52a is woven from the top of the first weft yarn 54 from the top of column C4 to under the second weft yarn 54 in column C6 to over the first weft yarn 54 in column C8 over the length of five columns. Warp yarns 52 undulate over and under at least one layer of weft yarns 54 to hold the weave together. Because warp yarns 52 weave, they have crimp angle α and are not straight. Crimp angles α create chordwise undulations in warp yarns 52 and decrease the stiffness properties in that direction. The magnitude of crimp angle α affects the stiffness and strength properties in both the inplane and through-thickness directions. For example, a larger crimp angle results in a larger decrease in inplane strength and stiffness properties in that direction but provides a larger increase in through-thickness stiffness and strength properties.

FIG. 3c illustrates the second plane of the layer-to-layer interlock weave, which includes warp yarns 52e, 52f, 52g and 52h (referred to generally as warp yarns 52), weft yarns 54 and surface weaver yarns 56. The second plane of FIG. 3c is similar to the first plane of FIG. 3b except warps yarns 52 are shifted to the right by two columns. Thus, the interlocking of warp yarns 52 and weft yarns 54 occurs at different locations in the first plane and the second plane. Surface weaver yarns 56 weave the edges of preform 48 together to maintain the integrity of the weave.

FIG. 3d illustrates the third plane of the layer-to-layer angle interlock weave. FIG. 3d includes weft yarns 54 and warp stuffer yarns 58a, 58b, 58c and 58d (referred to generally as stuffer yarns 58). Stuffer yarns 58 extend in the chordwise direction between weft yarns 54. Stuffer yarns 58 increase the stiffness and strength in the direction that warp yarns 52 extend (i.e. chordwise direction). Stuffer yarns 58 do not interweave with weft yarns 54 and therefore do not experience the crimp angle of warp yarns 52. Because stuffer yarns 58 are generally straight, they provide better stiffness properties. Additionally, stuffer yarns 58 provide additional control over the ratio of yarns in the spanwise direction to the yarns in the chordwise direction of the weave.

Warp yarns 52, weft yarns 54, surface weaver yarns 56 and stuffer yarns 58 of preform 48 are formed from bundles of fibers. Example fibers for yarns 52, 54, 56 and 58 of preform 48 include but are not limited to graphite fibers, glass and glass-based fibers, polymeric fibers, ceramic fibers (such as silicon carbide fibers) and boron fibers and combinations thereof. Each individual yarn 52, 54, 56, 58 has a constant number of fibers extending the length of the yarn 52, 54, 56, 58. The filament count of yarns 52, 54, 56, 58 is referred to as the yarn size. It is noted that in an untensioned state, the yarn size is proportional to the diameter of the yarn. The larger the yarn size, the larger the diameter of yarn 52, 54, 56, 58. During the weaving process, yarns 52, 54, 56, 58 can become elliptical in cross-sectional shape or may have a non-circular cross-sectional shape. As used in this disclosure, yarn diameter refers to the diameter of the yarn prior to the weaving process. It is recognized that yarns 52, 54, 56, 58 may not have a circular cross-sectional shape following the weaving process.

The number of weft yarns 54, warp yarns 52, surface weaver yarns 56 and stuffer yarns 58, the spacing between weft yarns 54, the spacing between warp yarns 52, the weave pattern and the repetition of the warp yarn planes are provided for example only. For example, a layer-to-layer angle interlock weave can be made using four repeating warp yarn planes in which the warp yarns are shifted one column to the right in each successive plane and/or the stuffer yarn planes and the surface weaver yarns are omitted. Additionally, a layer-to-layer angle interlock weave can be constructed using weft yarn columns that are staggered such that each even numbered weft yarn column has one less weft yarn than the odd numbered weft yarn column. Also, for example, preform 48 can have any three-dimensional weave pattern such as but not limited to a layer-to-layer angle interlock weave, a through-thickness angle interlock weave (as described further below) or an orthogonal weave. Various yarn sizes of yarns 52, 54, 56 and 58, number of yarns 52, 54, 56 and 58 and weaving patterns can be used without departing from the scope of this invention.

Warp yarns 52 and weft yarns 54 are woven on a loom to produce preform 48 as an integrally woven three-dimensional piece. Preform 48 is integrally woven as a single three-dimensional piece. Preform 48 is not comprised of a plurality of separate layers that are interwoven. In the weaving process, warp yarns 52 are drawn through an opening in a wire called a heddle whose motion can be controlled either by a harness or by a programmable loom head. The mechanism in the loom head can independently control the vertical motion of each heddle, such as on a Jacquard loom. Weft yarns 54 are inserted through warp yarns 52 from the side of the loom during the weaving process, and warp yarns 52 are woven around weft yarns 54. The motion of the heddles determines the weave pattern.

In preform 48, weft yarns 54 extend in the spanwise direction and warp or weaver yarns 52 extend in the chordwise direction and interweave weft yarns 54. FIG. 4a is an enlarged cross-sectional view of tip 42 of composite blade 32 taken along line 4-4 of FIG. 2. As shown in FIG. 4a, preform 48 can have a relatively constant thickness and lamination sections 50 can be placed on either side of preform 48. Preform 48 includes warp yarns 52 and weft yarns 54. Warp yarns 52 are illustrated in rows R1-R10. As described above, warp yarns 52 extend in the chordwise direction along composite blade 32. Warp yarns 52 in rows R1-R10 have the same yarn size as measured by filament count. That is, warp yarns 52 of tip 42 have about the same diameters. Weft yarns 54 extend in the spanwise direction. Weft yarns 54 can also have the same yarn size as measured by filament count. FIG. 4a illustrates a layer-to-layer angle interlock weave pattern comprised of four repeating planes of warp yarns 52. Each plane has a weave pattern similar to that shown in FIG. 3b and warp yarns 52 are moved one weft column to the right in each successive plane. To simplify FIG. 4a, surface weaver yarns 56 and warp stuffer yarns 58 are not shown. One skilled in the art will recognize that surface weaver yarns 56 and warp stuffer yarns 58 of FIGS. 3c and 3d, if present, also extend in the chordwise direction.

FIG. 4b is an alternative enlarged cross-sectional view of tip 42 of composite blade 32 that has a weave pattern similar to that shown in FIG. 4a except now tip 42 of preform 48 has a tapered shape. The tapered shape of tip 42 is formed by warp yarns 52. The yarn sizes as measured by filament count of warp yarns 52 decrease in the spanwise direction with increasing distance from root 44. The yarn sizes of warp yarns 52 in the same row, such as row R1, are the same. The yarn sizes of warp yarns 52 in different rows can be varied such that warp yarns 52 in row R1 have a smaller yarn size than warp yarns 52 in row R6. Reducing the yarn size of warp yarns 52 reduces the thickness of preform 48 and creates the tapered shape. Weaving preform 48 in the chordwise direction enables warp yarns 52 having smaller yarn sizes to be used where preform 48 is narrower and larger yarn sizes where preform 48 is thicker.

The number of warp yarns 52 in the spanwise direction of preform 48 can also be reduced with increasing distance from root 44. Reducing the number of warp yarns 52 is another factor that can be adjusted to change the thickness of preform 48. For example, there are four warp yarns 52 in row R1 and six warp yarns 52 in row R7. Weaving preform 48 in the chordwise direction enables carrying only the number of warp yarns 52 necessary for the thickness in that region. Extra or unnecessary warp yarns 52 are not carried. This eliminates waste of yarn. As described above, during the weaving process, warp yarns 52 extend in the chordwise direction while weft yarns 54 are passed back and forth in the spanwise direction through sheds formed in warp yarns 52. The number of warp yarns 52 in the chordwise direction can be decreased to reduce the thickness of a region of preform 48, such as in tip 42, or can be increased to increase the thickness of a region of preform 48, such as at root 44. The yarn size of warp yarns 52 in the chordwise direction, the number of warp yarns 52 in the chordwise direction or the yarn size and number of weft yarns 54 in the spanwise direction can be adjusted to control the thickness of preform 48.

Weft yarns 54 extend in the spanwise direction. The yarn size as measured by filament count is constant along the length of a specific weft yarn. As shown in FIG. 4b, weft yarns 54 can be dropped as the number of warp yarns 52 is reduced. For example, there are seven weft yarns 54 at a location between root 44 and tip 42 and five weft yarns 54 at tip 42. Surface weaver yarns 56 and warp stuffer yarns 58 are not shown in FIG. 4b to simplify the figure. One skilled in the art will recognize that, if present, surface weaver yarns 56 and warp stuffer yarns 58 of FIGS. 3c and 3d extend in the chordwise direction with warps yarns 52.

Figure 5A:
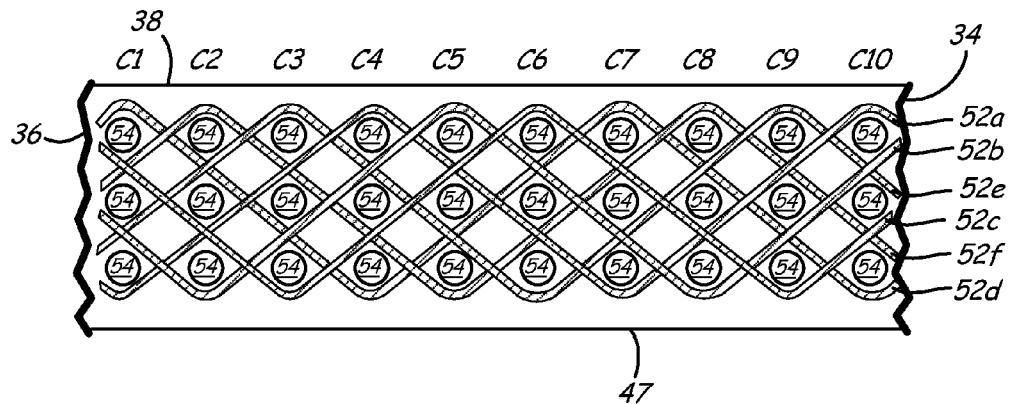
FIGS. 5a and 5b illustrate an alternative weave pattern for the composite fan blade.
Figure 5B:
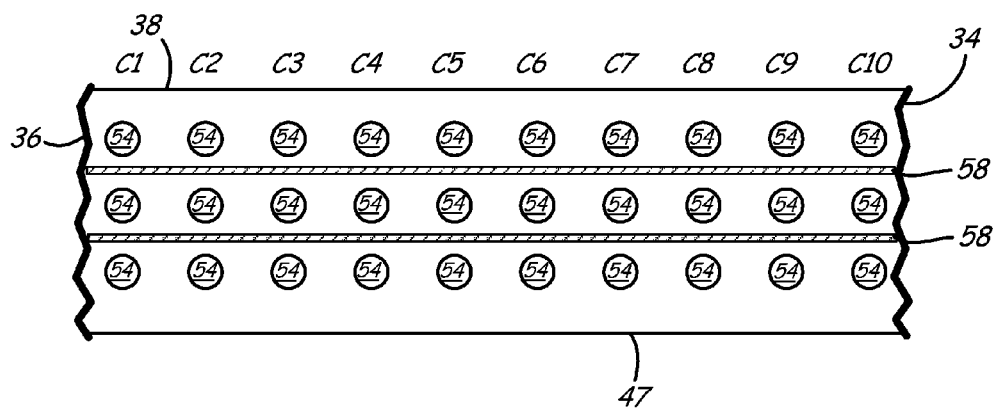

As described above, preform 48 is not limited to a layer-to-layer angle interlock weave pattern. FIGS. 5a and 5b illustrate an alternative through-thickness angle interlock weave pattern. This through-thickness angle interlock weave pattern comprises two planes that repeat along the spanwise axis of preform 48. FIG. 5a illustrates a first plane of the through-thickness angle interlock weave pattern which includes warp yarns 52a, 52b, 52c, 52d, 52e and 52f (referred to generally as warp yarns 52) and weft yarns 54. Warp yarns 52 extend in the chordwise direction from leading edge 34 to trailing edge 36. Weft yarns 54 are arranged in columns C1-C10 and extend in the spanwise direction between root 44 and tip 42.

In the through-thickness angle interlock pattern, warp yarns 52a, 52b, 52c, 52d, 52e and 52f are woven through the same plane. Warp yarns 52 interlock with the first and last weft yarns 54 of columns C1-C10. Each warp yarn 52 is woven through the entire thickness of preform 48 from pressure side 38 to suction side 47. Similar to that described above with respect to the layer-to-layer angle interlock weave pattern, warp yarns 52 have crimp angles because they are woven around weft yarns 54. The crimp angles of warp yarns 52 decrease the inplane stiffness and strength of preform 48 in the chordwise direction. In comparison, weft yarns 54 are generally straight and do not have the crimp angles experienced by warp yarns 52. Thus, weft yarns 54 do not experience decreased structural stiffness and strength following the weaving process.

FIG. 5b illustrates the second plane of the through-thickness angle interlock weave pattern, which includes weft yarns 54 and warp stuffer yarns 58. Weft yarns 54 extend in the spanwise direction, and stuffer yarns 58 extend in the chordwise direction from leading edge 34 to trailing edge 36. Stuffer yarns 58 provide additional stiffness in the chordwise direction.

Regardless of the weave pattern, preform 48 is woven in the chordwise direction so that weft yarns 54 extend in the spanwise direction and warp yarns 52 extend in the chordwise direction and interweave weft yarns 54. Weaving preform 48 in the chordwise direction results in increased stiffness and strength properties in the spanwise direction. Increased stiffness and strength properties in the spanwise direction is particularly important in airfoil 40 which is subjected to stresses and strains during normal operation and during impacts by foreign objects. Weaving preform 48 in the chordwise direction aligns weft yarns 54 in the spanwise direction and warp yarns 52 in the chordwise direction. Weft yarns 54 are relatively straight and thus have better structural properties such as stiffness and strength properties. In comparison, warp yarns 52 have a crimp angle due to interweaving and thus have reduced structural properties. Weaving preform 48 in the chordwise direction aligns weft yarns 54, which have better structural properties, along the spanwise direction where stiffness and strength are more important and aligns warp yarns 52, which have decreased structural properties, along the chordwise direction where stiffness and strength are less important.

Weaving preform 48 in the chordwise direction also avoids limitations on the number and yarn size of the yarns extending in the spanwise direction. As described above, when weaving in the chordwise direction, warp yarns 52 are fed through openings in heddles which are controlled from the head of a loom, and weft yarns 54 are inserted through sheds formed in warp yarns 52. The number of warp yarns 52 is limited by the capacity of the head of the loom. For example, in a Jacquard head, the number of warp yarns 52 is limited by the number of heddles that extend from the head through which warp yarns 52 are threaded. Weft yarns 54 are fed from the side of the weaving loom and thus are not limited in yarn size or number by the loom. When preform 48 is woven in the chordwise direction, weft yarns 54 extend in the spanwise direction such that the yarns in the spanwise direction (i.e. weft yarns 54) can be larger in number than the loom head may be able to accommodate. The use of more yarns enables smaller yarns sizes to be used to cover the same acreage.

Additionally, weaving preform 48 in the chordwise direction reduces the amount of wasted yarns because unnecessary yarns are not carried the length of preform 48. When preform 48 is woven in the chordwise direction, weft yarns 54 can be added or dropped as necessary to change the thickness of preform 48 along the length of preform 48 in the spanwise direction. The span of each weft yarn 54 in the spanwise direction can be controlled by how the weft yarn 54 is passed through the shed of warp yarns 52. The passing of a weft yarn 54 through warp yarns 52 is also known as a flight. Weft yarns 54 are inserted through the side of the loom and are not required to extend the entire span of preform 48. That is, the flight of each weft yarn 54 can be controlled so that weft yarns 54 only extend a specified length in the spanwise direction.

Further, weaving preform 48 in the chordwise direction enables the correct number and yarn size of warp yarns 52 to be used in each region of preform 48. As suggested by FIG. 4*b*, the thickness of preform 48 in the through-thickness direction can change over the span of preform 48 from root 44 to tip 42. For example, preform 48 can have a dovetail root 44 that is between about 5.1 cm (2 inches) and about 7.6 cm (3 inches) thick and tip 42 that is less or equal to about 0.6 cm (0.25 inch) thick. When weaving in the chordwise direction, individual warp yarns 52 extend in the chordwise direction from leading edge 34 to trailing edge 36. Warp yarns 52 are stacked in the spanwise direction. In the spanwise direction, the yarn size and number of warp yarns 52 can be changed to tailor the thickness of preform 48. Only the size and number of warp yarns 52 that are needed are carried along preform 48. Weaving preform 48 in the chordwise direction prevents carrying unnecessary warp yarns 52 the length of preform 48.

Weaving preform 48 in the chordwise direction also increases the ease of changing weave patterns within preform 48. Preform 48 may not have the same weave pattern throughout. Instead, the weave pattern of preform 48 can be changed in the spanwise direction to further tailor the properties of preform 48. For example, a low angle layer-to-layer angle interlock weave pattern, such as a weave pattern having crimp angle $\alpha$ between about 5 and about 10 degrees, can be used in airfoil 40 while a large angle layer-to-layer angle interlock weave pattern, such as a weave pattern having crimp angle $\alpha$ between about 35 and about 70 degrees, can be used in root 44. The larger crimp angle $\alpha$ increases the through-thickness stiffness and strength properties in root 44, and improves the ability of preform 48 to withstand stresses from operation and foreign object strikes.

When weaving in the chordwise direction, warp yarns 52 can be segregated into different regions in the spanwise direction and different weave patterns can be applied to each region. Because warp yarns 52 are woven in the chordwise direction, the same weave pattern is applied along the chordwise direction of preform 48 such that the weave pattern at the leading edge and the trailing edge of a given chord is the same, while the weave pattern can be changed along the spanwise direction such that the weave pattern at the root and the tip may be different. When weaving preform 48 in the chordwise direction, the weave patterns and the regions in which these patterns are to be applied are determined at the start. The weave patterns of preform 48 are not changed during the weaving process. Instead, the different weave patterns are started along preform 48 at the beginning of the weaving process and are carried out in the chordwise direction throughout the process. Thus, the manufacturing process is simplified.

In summary, weaving preform 48 in the chordwise direction compared to other weaving methods, such as weaving preform 48 in the spanwise direction, produces an improved preform 48. For example, weaving preform 48 in the chordwise direction provides more control over the stiffness and strength properties of preform 48. Weaving preform 48 in the chordwise direction also reduces waste and simplifies the manufacturing process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A composite blade having a root and a tip in a spanwise direction and a leading edge and a trailing edge in a chordwise direction, the composite blade comprising:
    a three-dimensionally woven preform comprising:
        weft yarns extending in the spanwise direction of the composite blade; and
        warp yarns interweaving the weft yarns and extending in the chordwise direction of the composite blade.

2. The composite blade of claim 1, wherein the three-dimensionally woven preform further comprises stuffer yarns extending in the chordwise direction of the blade.

3. The composite blade of claim 1, wherein the weft yarns are generally straight and the warp yarns have a crimp angle.

4. The composite blade of claim 1, wherein the warp yarns interweave the weft yarns with a layer-to-layer angle interlock weave pattern.

5. The composite blade of claim 1, wherein the warp yarns interweave the weft yarns with a through-thickness angle interlock weave pattern.

6. The composite blade of claim 1, wherein the warp yarns interweave the weft yarns in the root with a first weave pattern and the warp yarns interweave the weft yarns in the tip with a second weave pattern.

7. The composite blade of claim 1, wherein the warp yarns vary in yarn size as measured by filament count in the spanwise direction to change a thickness of the three-dimensional woven airfoil.

8. The composite blade of claim 1, and further comprising:
    a first plurality of plies positioned between a pressure side of the composite blade and the three-dimensionally woven preform; and
    a second plurality of plies positioned between a suction side of the composite blade and the three-dimensionally woven preform.

9. A three-dimensionally woven preform for a composite blade, the preform comprising:
    substantially straight weft yarns extending in a spanwise direction of the preform between a root and a tip; and
    warp yarns extending in a chordwise direction of the preform between a leading edge and a trailing edge, the warp yarns interweaving the weft yarns and having a crimp angle.

10. The three-dimensional woven preform of claim 9 wherein the yarn size as measured by filament count of the warp yarns is varied to vary a thickness of the three-dimensional woven preform.

11. The three-dimensional woven preform of claim 10, wherein the yarn size as measured by filament count of the warp yarns decreases with increasing distance from the root.

12. The three-dimensional woven preform of claim 9, and further comprising:
    stuffer yarns extending in the chordwise direction.

13. The three-dimensional woven preform of claim 9, wherein the preform has a first region extending from a leading edge to a trailing edge of the preform and a second region extending from the leading edge to the trailing edge of the preform and the warp yarns interweave the weft yarns in the first region to form a first weave pattern and the warp yarns interweave the weft yarns in the second region to form a second weave pattern.

* * * * *